G. L. FECKER.
MIRROR HOLDER FOR OPTICAL INSTRUMENTS.
APPLICATION FILED MAR. 19, 1917.
1,281,926.
Patented Oct. 15, 1918.
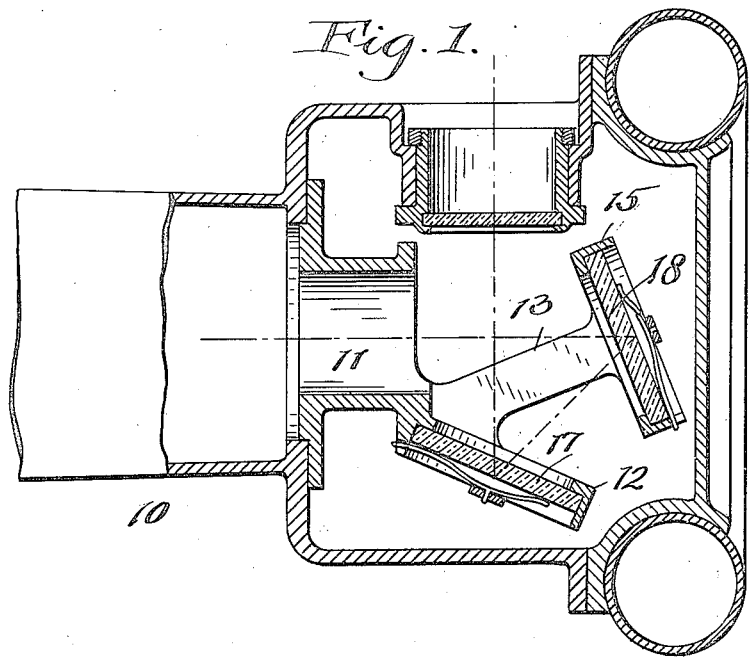
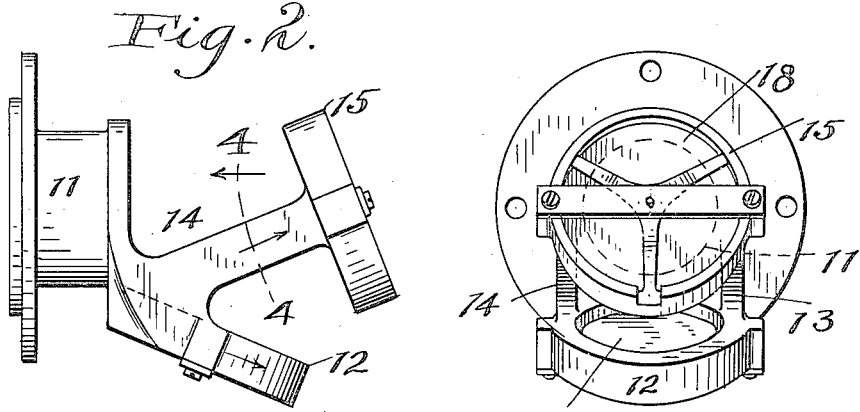
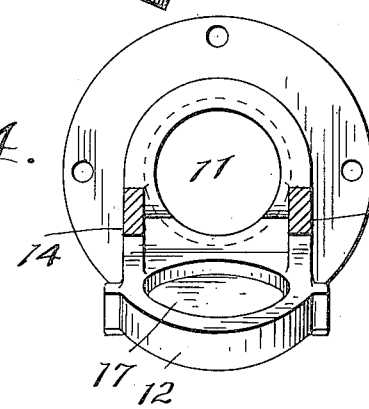
Inventor:
Gottlieb L. Fecker,
By Thurston & Kwis
attys.

UNITED STATES PATENT OFFICE.

GOTTLIEB L. FECKER, OF CLEVELAND, OHIO, ASSIGNOR TO THE WARNER & SWASEY COMPANY, OF CLEVELAND, OHIO, A CORPORATION OF OHIO.

MIRROR-HOLDER FOR OPTICAL INSTRUMENTS.

1,281,926.  Specification of Letters Patent.  Patented Oct. 15, 1918.

Application filed March 19, 1917. Serial No. 155,698.

*To all whom it may concern:*

Be it known that I, GOTTLIEB L. FECKER, a citizen of the United States, residing at Cleveland, in the county of Cuyahoga and State of Ohio, have invented a certain new and useful Improvement in Mirror-Holders for Optical Instruments, of which the following is a full, clear, and exact description.

It is common to employ in optical instruments, such for example, as range finders, right angle reflectors whose function is to bend the incoming light rays and reflect them at right angles to some functioning part of the instrument. Pentagonal glass prisms are largely used for this purpose, and are generally regarded as the best double reflecting device available for the purpose. But the sides of a pentagonal prism are of various lengths. As a result, when such prisms are exposed to extremes of heat or cold, they expand and contract slightly but unevenly, because of the above mentioned unequal length of the sides thereof. This unequal expansion changes the angular relation of the functioning reflecting sides, and therefore introduces inaccuracy into the instrument. Likewise, when such prisms have been once distorted in the manner stated, they rarely resume their original shape when restored to normal temperature conditions.

The object of this invention is to provide a metallic holder for two optically correct reflecting mirrors, by which they will be held in proper angular relation to one another; and which is so constructed that as the component parts thereof are expanded and contracted by varying temperatures, the angular relation of reflecting surfaces of the two mirrors will not be changed.

To this end the invention consists in the mirror holder shown in the accompanying drawings hereinafter described and pointed out definitely in the appended claims.

In the drawings, Figure 1 is a longitudinal central section of the base tube of an optical instrument, and of the mirror holder in which the present invention is embodied, secured therein in operative position. Fig. 2 is a side elevation of said mirror holder; Fig. 3 is an end view of the mirror holder from the right end of Fig. 1; and Fig. 4 is a similar view of said mirror holder when sectioned in the plane indicated by line 4—4 on Fig. 2.

This mirror holder is made up of several integral parts, of which the tubular member 11 is constructed so that it may be fixed within the base tube 10 of an optical instrument with its axis coincident with the axis of the said base tube 10.

An arm 12 projects from the edge of one end of this tubular body away from said body and at an angle away from the axis thereof. This arm is in the form of an annulus particularly adapted to serve as a frame for the reflecting mirror 17; and it lies in a plane which is substantially parallel with the reflecting surface of that mirror. Because of this fact the expansion and contraction of this arm, which may result from temperature changes, will not change the angle of the reflecting surface of said mirror with respect to the axis of the body 11. Two other arms 13 and 14 are parallel with each other, and are integrally united with the arm 12 and with the tubular body 11; and their outer ends are connected by an annular frame 15 which intersects the axis of the body 11, at an angle and extends in a plane at right angles to the direction in which said arms extend, and in a direction also which is parallel with the reflecting surface of the mirror 18 which said arm 15 is constructed to carry.

The arms 13 and 14 will expand and contract in the direction of their length; and which is at right angles to the reflecting surface of the mirror 18; while the annular arm 15, when it expands or contracts, will do this in planes which are parallel with said reflecting surface. Therefore, such expansion and contraction of the supports for the mirror 18 will not have the effect of changing the angular relation between its reflecting surface and the axis of the body 11 or the reflecting surface of the mirror 17.

Having described my invention, I claim:—

1. In an optical square the combination of a tubular body, a mirror receiving frame extending outwardly from the edge of the tubular body at an angle to the axis thereof, a second mirror receiving frame disposed in the axis of the tube and at an angle thereto and parallel arms extending from the edge of the tubular body to the second frame at right angle thereto, all said parts forming an integral structure.

2. An optical square comprising a tubular body, a frame extending outwardly from the edge of the tubular body at an angle to the axis thereof and carrying a reflector, a second frame carrying a reflector disposed to coöperate with the first reflector to reflect rays of light coming therefrom into the tubular body and parallel arms extending from the edge of the tubular body to the second frame at right angle thereto, all said parts forming an integral structure.

3. A mirror holder for an optical instrument comprising the following integral parts, to wit, a tubular body member, a frame shaped arm which extends from one edge of one end of said body away from the body and away from the axis of the body, two parallel arms which project from the said edge of the same end of the body away from the body but at an angle toward the axis of the body, and a frame shaped arm which extends between the outer ends of said parallel arms in a direction at right angles thereto and at a point such that said frame shaped arm intersects the axis of said body.

4. In a mirror holder for an optical instrument comprising a tubular body having at one end a frame shaped arm which extends from one edge of the body away from the body and away from the axis of said body and in a direction which is parallel with the reflecting surface of the mirror which said arm is constructed to hold, two parallel arms which project from the same edge of the same end of said body away from the body toward the axis of the said body, and a frame shaped arm which is connected with the ends of said parallel arms and is at right angles thereto and parallel with the reflecting surface of the mirror which said frame shaped arm is constructed to hold and which intersects the axis of said body.

5. A mirror holder for optical instruments comprising a tubular frame member, a circular arm integral therewith and extending therefrom in a direction which is parallel with the reflecting surface of the mirror which said arm is designed to frame, and two parallel arms extending from the front end of said frame member, a circular mirror frame integral with and connected with the other ends of said parallel arms and adapted to hold a mirror in a position such that its reflecting face will be at right angles to the length of said arms.

6. The combination with a base line telemeter having a base tube apertured adjacent its end to receive rays of light from an object, of an optical square to direct the light rays passing through said aperture in the direction of the base line, said optical square comprising a tubular body coaxially related to the base tube, a frame extending from the edge of the tubular body at an angle to the axis thereof and carrying a reflector to receive the rays passing through the said aperture, a second frame carrying a reflector to reflect rays of light coming from the first reflector through the tubular body and parallel arms extending from the edge of the tubular body to the second frame at right angle thereto, the said tubular body, the said frames and the parallel arms forming an integral structure.

In testimony whereof, I hereunto affix my signature in the presence of two witnesses.

GOTTLIEB L. FECKER.

Witnesses:
   J. W. FECKER,
   H. C. BAILEY.